(12) United States Patent
Schoner et al.

(10) Patent No.: US 7,339,627 B2
(45) Date of Patent: Mar. 4, 2008

(54) METHOD AND SYSTEM FOR AUTOMATIC DETECTION AND DISPLAY OF ASPECT RATIO

(75) Inventors: Brian Schoner, Fremont, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 460 days.

(21) Appl. No.: 10/754,311

(22) Filed: Jan. 9, 2004

(65) Prior Publication Data

US 2005/0094033 A1 May 5, 2005

Related U.S. Application Data

(60) Provisional application No. 60/515,777, filed on Oct. 30, 2003.

(51) Int. Cl.
*H04N 5/46* (2006.01)
*G06K 9/38* (2006.01)

(52) U.S. Cl. ............... 348/558; 348/556; 382/270; 382/271; 382/272

(58) Field of Classification Search .......... 348/556, 348/558, 913; 382/270–274; H04N 5/46
See application file for complete search history.

(56) References Cited

U.S. PATENT DOCUMENTS

| | | | | |
|---|---|---|---|---|
| 5,309,234 A | * | 5/1994 | Kranawetter et al. | 348/473 |
| 5,351,135 A | * | 9/1994 | Saeger | 348/435.1 |
| 5,486,871 A | * | 1/1996 | Filliman et al. | 348/558 |
| 5,686,970 A | * | 11/1997 | Tani et al. | 348/558 |
| 5,748,257 A | * | 5/1998 | Kawabata et al. | 348/615 |
| 5,760,840 A | * | 6/1998 | Tani et al. | 348/558 |
| 5,949,494 A | * | 9/1999 | Yamagata et al. | 348/558 |
| 5,956,092 A | * | 9/1999 | Ebihara et al. | 348/445 |
| 5,973,749 A | * | 10/1999 | Ishii et al. | 348/558 |
| 5,990,971 A | * | 11/1999 | Nakai et al. | 348/558 |
| 6,064,445 A | * | 5/2000 | Kim et al. | 348/581 |
| 6,208,385 B1 | * | 3/2001 | Konishi et al. | 348/558 |
| 6,340,992 B1 | * | 1/2002 | Markandey | 348/556 |
| 6,366,706 B1 | * | 4/2002 | Weitbruch | 382/254 |
| 6,947,097 B1 | * | 9/2005 | Joanblanq | 348/558 |
| 2004/0119891 A1 | * | 6/2004 | Barnichon | 348/556 |
| 2005/0002570 A1 | * | 1/2005 | Clark et al. | 382/199 |

* cited by examiner

*Primary Examiner*—Brian P. Yenke
(74) *Attorney, Agent, or Firm*—McAndrews, Held & Malloy, Ltd.

(57) ABSTRACT

Certain embodiments of the invention may be found in a method and system for automatic aspect ratio detection and may comprise scanning lines in at least a selected portion of an image and locating a first reference pixel in one of the scanned lines. A corresponding sliding sum and a sliding number may be generated starting from the first reference pixel and a white edge determined based on the generated sliding sum and/or the generated sliding number. The first reference pixel may be a non-black pixel and a value which corresponds to and defines non-black may be variably defined. The sliding sum and the sliding number may utilize m bins, where m is greater than one (1). A luma sum threshold may be compared with the generated sliding sum to locate the white edge for aspect ratio detection.

35 Claims, 7 Drawing Sheets

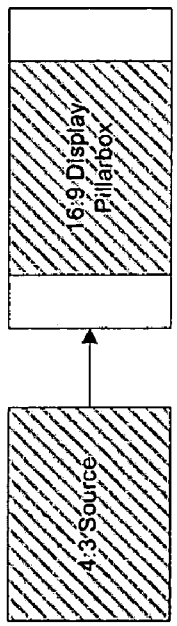
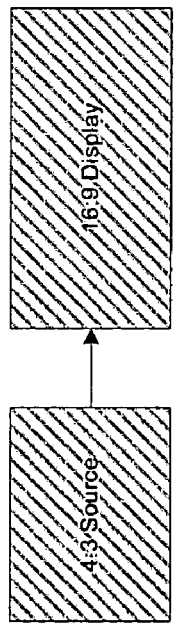
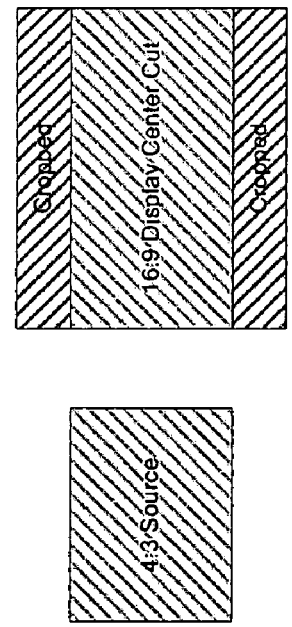
FIG. 1A
FIG. 1B
FIG. 1C
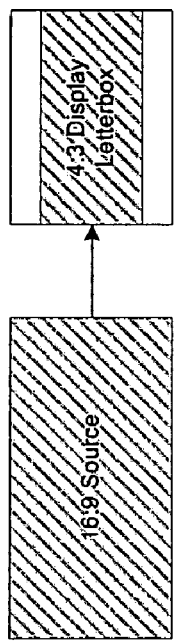
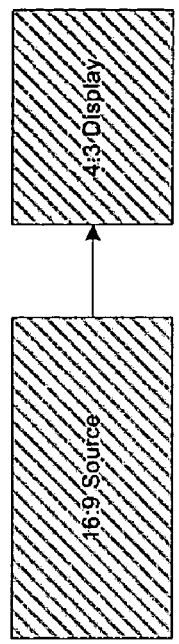

| Source | Description | Expected Result |
|---|---|---|
| | Dim Box<br><br>A dim band with clear edges | Letterbox |
| | Bright Box<br><br>A bright band with clear edges | Strong Letterbox |
| | Partial Edge<br><br>An edge that does not extend across the full screen | Directly proportional to edge width |
| | Fuzzy Edge<br><br>An irregular edge due to jitter or filtering | Letterbox if edge is sharp.<br><br>Inconclusive if edge is too fuzzy. |
| | Starry Sky<br><br>Small bright points | Inconclusive |
| | Excursions<br><br>Any non-black signal in the "black" range. (A few points can optionally be allowed due to noise.) | Not letterbox |

FIG. 2

METHOD AND SYSTEM FOR AUTOMATIC DETECTION AND DISPLAY OF ASPECT RATIO

CROSS-REFERENCE TO RELATED APPLICATIONS/INCORPORATION BY REFERENCE

The application makes reference to, claims priority to, and claims the benefit of U.S. Provisional Application Ser. No. 60/515,777 filed Oct. 30, 2003.

This application also make reference to U.S. patent application Ser. No.10/314,525 filed Dec. 9, 2002.

The above stated applications are hereby incorporated herein by reference their entirety.

FIELD OF THE INVENTION

Certain embodiments of the invention relate to image processing. More specifically, certain embodiments of the invention relate to a method and system for automatic aspect ratio detection and edge detection.

BACKGROUND OF THE INVENTION

Aspect ratio refers the ratio of a width (W) of an image or to a height (H) of the image, or W:H. For most conventional televisions, the aspect ratio is 4:3. In the case of high definition television (HDTV), most have an aspect ratio of 16:9. Notwithstanding, the aspect ratio and the number of vertical scan lines in the image may determine an appropriate sample rate that should be utilized to digitize the video image.

Aspect ratio accommodation refers to presentation of an image having a first native aspect ratio in a second non-native aspect ratio. Various techniques have been developed to facilitate aspect ratio accommodation, some of which may include blanking adjust, truncation, pan and scan, anamorphic squeeze, and shoot and protect. While blanking adjust and shoot and protect may maintain a director's intent during aspect ratio accommodation, truncation, pan and scan, and anamorphic squeeze does not maintain a director's intent. Truncation, pan and scan, anamorphic squeeze and shoot and protect utilizes full screen, but blanking and adjust does not utilize full screen. Blanking adjust, anamorphic squeeze, and shoot and protect may display all action, but truncation and pan and scan may not display all action.

Blanking adjust, truncation, pan and scan, and shoot and protect may maintain picture geometry during aspect ratio accommodation, but picture geometry is not maintained in anamorphic squeeze. Automatic conversion may be done with blanking adjust, truncation, anamorphic squeeze, and shoot and protect, but automatic conversion is not possible with pan and scan. Full freedom production may be achieved with blanking adjust, truncation, pan and scan, and shoot and protect, but full production freedom is not possible with anamorphic squeeze.

A letterbox image is an image in which about three-quarters of the vertical picture height has been limited so that a wider aspect ratio may be achieved. Accordingly, the image has be reduced to a letter or letterbox size and hence the name letterbox. Currently, no clear requirement exists for letterbox detection (LBOX), and at best, conventional letterbox detection may best be described as "count black lines."

Center cut, also called center cut out, or CCO, refers to an aspect ratio correction performed by cropping a region from the source stream. This is similar to "pan and scan" utilized in DVDs, for example. Square scaling, also called aspect ratio correct scaling, refers to instances where an image is scaled equally in the X and Y directions. Square scaling does not change the aspect ratio. Non-square scaling, also called aspect ratio incorrect scaling, refers to instances where an image is scaled disproportionately in the X-axis and Y-axis directions. A non-square scaling may be implemented as an anamorphic scaling, or a non-linear scaling, or any other disproportionate method. However, non-square scaling results in a change in the aspect ratio.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for automatic aspect ratio detection. Aspects of the method for automatic aspect ratio detection may comprise scanning lines in at least a selected portion of an image and locating a first reference pixel in one of the scanned lines. A corresponding sliding sum and a sliding number may be generated starting from the first reference pixel and a white edge determined based on the generated sliding sum and/or the generated sliding number. The first reference pixel may be a non-black pixel based on an associated value of the reference pixel and a value that represents non-black may be defined for a non-black pixel. The method may further comprise utilizing m bins for each of the sliding sum and the sliding number, where m is greater than one (1). A luma sum threshold may be compared with the generated sliding sum to locate the white edge for aspect ratio detection.

The sliding sum may be determined utilizing the following relationship: sliding sum value[k]=prior sliding sum value[k]+(pixel value−non-black threshold), where k=(current column−left edge); prior sliding sum value[k] is initially zero (0) for each of the m bins; left edge is the column where the leftmost pixel is located, and k is not less than zero (0). If k is not less than zero (0), then sliding number[k] may be incremented for each of the m bins to determine the sliding number. If k is less than zero (0), then mod[k] rightmost values of the sliding sum may be slid or shifted out and discarded, and mod[k] zeroes (0s) may be slid or shifted into the leftmost values of the sliding sum. If k is less than zero (0), then mod[k] rightmost values of the sliding number may be slid or shifted out and discarded, and mod[k] zeroes (0s) may be slid or shifted into the leftmost values of the sliding number. If k is less than zero (0), then a left edge may be set equal to the current column, k may be initialized to zero (0) and the sliding sum value [k] computed utilizing the relationship above.

Certain embodiments of the invention may be found in a machine-readable storage having stored thereon, a computer program having at least one code section for automatic aspect ratio detection, the at least one code section being executable by a machine for causing the machine to perform steps as described above for automatic aspect ratio detection.

Aspects of the system for automatic aspect ratio detection may comprise at least one processor that scans lines in at least a selected portion of an image and locates a first reference pixel in one of the scanned lines. The processor may be a host processor or an on-chip processor, for example, which may be coupled to a video network (VN)

crossbar. The processor may generate a corresponding sliding sum and a sliding number starting from the first reference pixel and a white edge determined based on the generated sliding sum and/or generated sliding number. The first reference pixel may be a non-black pixel with its non-black characteristic being based on an associated value of the reference pixel and a value that represents non-black may be defined for a non-black pixel. The processor may be adapted to utilize m bins for each of the sliding sum and the sliding number, where m is greater than one (1). In one embodiment of the invention, four (4) bins may be utilized. However, the invention is not so limited and other values may be utilized. Notwithstanding, the processor may compare a luma sum threshold with the generated sliding sum to locate the white edge for aspect ratio detection.

The processor may be adapted to determine the sliding sum utilizing the following relationship: sliding sum value [k]=prior sliding sum value[k]+(pixel value−non-black threshold), where k=(current column−left edge); prior sliding sum value[k] is initially zero (0) for each of the m bins; left edge is the column where the leftmost pixel is located, and k is not less than zero (0). If k is not less than zero (0), then the processor may increment the sliding number[k] for each of the m bins to determine the sliding number. If k is less than zero (0), the processor may slide or shift out and discard mod[k] rightmost values of the sliding sum, and mod[k] zeroes (0s) may be slid or shifted into the leftmost values of the sliding sum. If k is less than zero (0), the processor may slide or shift out and discard mod[k] rightmost values of the sliding number, and mod[k] zeroes (0s) may be slid or shifted into the leftmost values of the sliding number. If k is less than zero (0), then the processor may set a left edge equal to the current column, k may be initialized to zero (0) and the sliding sum value [k] computed utilizing the relationship above.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A illustrates aspect ratio accommodation from 4:3 aspect ratio to 16:9 pillarbox and 4:3 letterbox which may be provided in connection with letterbox detection in accordance with an embodiment of the invention.

FIG. 1B illustrates non-square scaling which may be provided in connection with letterbox detection in accordance with an embodiment of the invention.

FIG. 1C illustrates center cut or center cut out aspect ratio correction which may be provided in connection with letterbox detection in accordance with an embodiment of the invention.

FIG. 2 is an exemplary chart illustrating expected LBOX behavior for various types of sources which may be provided in connection with letterbox detection in accordance with various embodiments of the invention.

DETAILED DESCRIPTION OF THE INVENTION

Figure 3A:
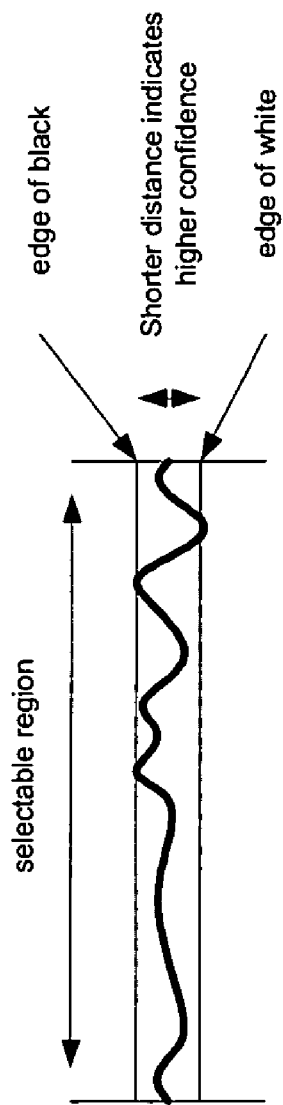
FIG. 3A is a diagram illustrating letterbox detection for a fuzzy line which may be provided in connection with letterbox detection in accordance in accordance with an embodiment of the invention.

Certain embodiments of the invention may be found in a method and system for automatic aspect ratio detection and may comprise scanning lines in at least a selected portion of an image and locating a first reference pixel in one of the scanned lines. A corresponding sliding sum and a sliding number may be generated starting from the first reference pixel and a white edge determined based on the generated sliding sum and/or the generated sliding number. The first reference pixel may be a non-black pixel and a value corresponding to non-black may be variably defined. The sliding sum and the sliding number may utilize m bins, where m is greater than one (1). A luma sum threshold may be compared with the generated sliding sum to locate the white edge for aspect ratio detection.

Various embodiments of the invention may be utilized to detect a wide variety of video including letterbox, pillarbox and postage stamp video. The method and system may be utilized in a dimly lit environment, with dimly lit subjects, with subjects or materials with noise, and with materials that are not all black or near black. Images that are shifted, in any aspect ratio or non-square, may also be detected and displayed. Additionally, selective portions of a subject may also be operated on in order to ignore undesired images such logos and static images in a letterbox, for example.

Although there may be corner cases with respect to letterbox detection, in accordance with various aspects of the invention, the letterbox method and system as disclosed herein may be utilized to detect, for example, lefterbox, pillarbox, and/or "postage stamp" video sources. In generally, letterbox detection may be adapted to provide detection information to a host system or processor on a field-by-field and/or a frame-by-frame basis and accordingly, the host system is expected to do a minimal amount of processing on the detection information. For example, the host system or processor may be provided with the number of black rows and/or columns that may be at the edges of a video source. Based on the calculations and/or estimations, a confidence score may be generated and provided to a host system, which indicates a general confidence level of the edge strength for the video source. In instances where a video source may contain black edges and a reasonably bright content, edge information may also be reliably detected and accurately determined. Letterbox detection may also be utilized to calculate a minimum luma value for each field and this determined minimum luma value may be utilized to set a threshold for a black level.

Even though some video content may comprise logos and subtitles, certain aspects of the invention may comprise constraining edge detection in order to avoid those areas in the video content that may include known logos or subtitles. Accordingly, in certain instances, letterbox detection may be constrained in order to avoid regions that may comprise subtitles from being treated as non-black lines. Although letterbox detection may not provide extremely high confidence scores results for very dimly lit images or images with predominantly black edges, it may nevertheless be utilized to provide some level of detection. Although the letterbox detection may operate on noisy signals, like may other systems, performance of the letterbox detection may, in certain instances, be degraded by noise.

Letterbox detection may be adapted to check a full frame for analog/external sources and for MPEG sources. For a feeder system, for example, the letterbox detection may be adapted to check a window output from the feeder. In operation, information generated by the letterbox detection for a video source may also be utilized for pillarbox detection, center cut detection and postage stamp detection. Furthermore the hardware that may be utilized for letterbox detection may be less complex than hardware utilized by conventional aspect ratio accommodation systems and methods.

Black area sensing has the disadvantage of being incapable of differentiating between raster black as in black bands caused by letterboxing and intentional or editorial black, which may be deliberately included in a program scene. Therefore, black area sensing in television sets may have to be disabled in the presence of valid aspect ratio signaling. In this regard, line 23 or MPEG Header plus active format descriptor (AFD) for idTVs and Line 23 or PIN 8 for analog television sets may have to be disabled. In the case of wide screen signaling (WSS), wide screen signaling information is encoded in 4 bits (b0, b1, b2, b3) on line 23 of NTSC & PAL broadcasts. Wide screen signaling may be utilized to indicate one of 8 aspect ratios for the broadcast data, including 4:3, 14:9 top & center, 16:9 top & center and 16:9 anamorphic squeeze. For MPEG systems, similar information is carried in the sequence header aspect ratio field. Active format descriptor (AFD) contains information about protected regions within a window. Active format descriptor may only be utilized for MPEG systems.

FIG. 1A-1C are exemplary block diagrams illustrating the changing of aspect ratio or aspect ratio accommodation in connection with various embodiments of the invention. In particular, FIG. 1A illustrates aspect ratio accommodation from 4:3 aspect ratio to 16:9 pillarbox and 4:3 letterbox which may be provided in connection with lefterbox detection in accordance with an embodiment of the invention. Pillarbox and letterbox change the aspect ratio by adding black strips to the sides (pillarbox) or top/bottom (letterbox). The image may then be square-scaled to the correct size.

FIG. 1B illustrates non-square scaling which may be provided in connection with letterbox detection in accordance with an embodiment of the invention. In particular, FIG. 1B illustrates aspect ratio accommodation from 4:3 aspect ratio to 16:9, and from 16:9 aspect ratio back to 4:3 utilizing non-square scaling. Non-square scaling or aspect ratio incorrect scaling may be utilized to convert between standard definition and high definition resolutions.

FIG. 1C illustrates center cut or center cut out aspect ratio correction which may be provided in connection with letterbox detection in accordance with an embodiment of the invention. In particular, FIG. 1C illustrates aspect ratio accommodation from 4:3 aspect ratio to 16:9, and from 16:9 aspect ratio back to 4:3 utilizing center cut. Center cut may change the aspect ratio by cropping regions, and then square-scaling to the correct size.

Although the detection utilized herein is referred to as letterbox detection or LBOX, the invention is not limited to letterbox detection but may also be applicable to pillarbox and center cut aspect ratio correction. Letterbox detection may involve certain issues that may limit detection and/or display. For example, with respect to detection, wide screen signaling, aspect ratio, and Active format descriptor information are not always available. In these cases, the system may need to infer the aspect ratio from the source. With regard to subtitles, black regions created for letterbox video are often used for subtitles, closed-captioning, logos, and graphics. Accordingly, some systems may scale to letterbox specifically to make room for accommodating subtitles. For example, broadcasters may often scale to a letterbox format to make room for sports scores, news flashes and logos.

A common problem for letterbox detection is the credits at the start or end of a film. If the background is black, it may be impossible to tell whether the source is 4:3 or 16:9. With regard to soft edges, black regions may have soft edges. This may be due to low-pass filtering for NTSC broadcast, MPEG mosquito noise, or for aesthetic reasons. The black edges may drift over time due to horizontal synchronization (hsync) jitter, or noise at the source. This phenomenon results in fuzzy edges. In instances where brightness is turned up, the black areas may become less black, and may be undetectable. This is particularly true is the brightness is disproportionately high.

FIG. 2 is an exemplary chart illustrating expected LBOX behavior for various types of sources which may be provided in connection with letterbox detection in accordance with various embodiments of the invention. Referring to FIG. 2, the letterbox detection may be utilized to adequately detect, for example, a dim box having a dim band with clear edges. In the case of a bright box comprising bright bands with clear edges, the letterbox detection may be strong, and accordingly provide very high confidence levels. In the case of a partial edge, which may extend fully across the screen, the expected result may be proportional to the edge width. In instances where there may be a fuzzy edge, for example, an irregular edge that may have been caused by jitter, a letterbox will be produced in cases where the edge may be sharp. However, in cases where the edge may be fuzzy, then the result may be inconclusive. In another example, in the case of a starry sky comprising small bright points, the results of the detection may be inclusive. Finally, for excursions which comprise any non-black signal in the black range, then no letterbox may be produced.

FIG. 3A is a diagram illustrating letterbox detection for a fuzzy line which may be provided in connection with letterbox detection in accordance in accordance with an embodiment of the invention. Referring to FIG. 3A or the "fuzzy line" example, due to the serrations present in the fuzzy line, it may be difficult to shade under the fuzzy line. For illustrative purposes, consider the fuzzy line as a boundary that exists between black and white. While looking for a top edge, the letterbox detection algorithm may be adapted to record the highest line that is clearly black, and the highest line that is clearly white. However, since white may be programmable, it may actually be represented by a low luma value. If the line is not too fuzzy, the distance between black and white may be small. Accordingly, this may indicate a high confidence letterbox. The strength for white may also be recorded and may give a very high confidence to very bright edges. If the location of the edge of the line corresponds to a typical letterbox case, it may further increase confidence. If the line is very fuzzy or blurry, the distance between black and white may be larger, indicating a low confidence.

Figure 3B:
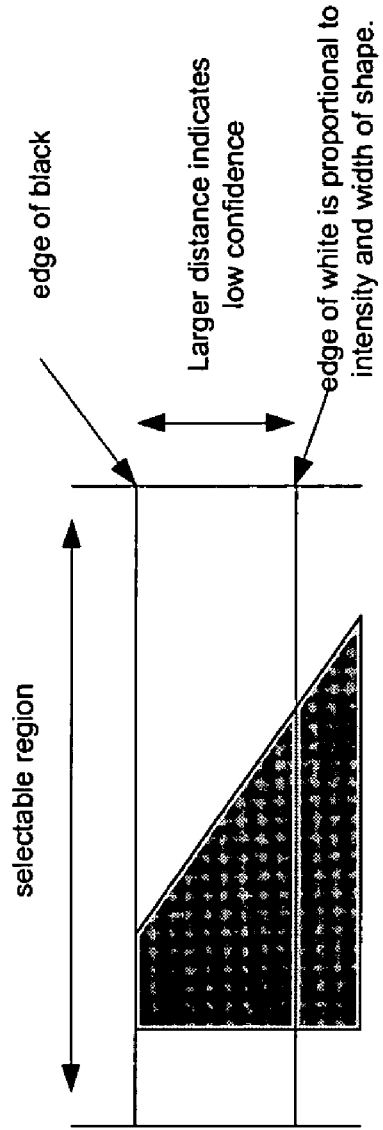
FIG. 3B is a diagram illustrating letterbox detection for a partial edge condition which may be provided in connection with letterbox detection in accordance in accordance with an embodiment of the invention.

FIG. 3B is a diagram illustrating letterbox detection for a partial edge condition which may be provided in connection with letterbox detection in accordance with an embodiment of the invention. Referring to FIG. 3B, in the partial edge condition, the edge of black is illustrated and is located at a fairly large distance from the edge of white. The edge of white may be proportional to the intensity and width of the shape. Accordingly, the large distance between the edge of black and the edge of white may result in a low confidence score. The black edge may be very sensitive, and this may typically indicate the topmost edge of black. The white edge may be less sensitive, and typically requires a strong white signal for detection. Since the sensitivities of black and white may be programmable, depending on the shape, the distance between black and white may be very small, or very large and the result may be proportional.

With regard to temporal behavior, in order to acquire a high confidence score for letterbox detection, it may be best to look over a plurality of frames, for example, about 30-300. Various rules may be established and serve as general guidelines during letterbox detection. For example, if any excursions occur during a sampling period, then there may be no letterbox. Otherwise, the confidence in the edge is the maximum confidence over the sampling period. Accordingly, the letterbox statistics may be read at the end of every field, and these general rules may be checked utilizing software, or firmware for example. In an alternative embodiment of the invention, letterbox detection may be programmed to record the maximum confidence parameters, and/or generate an interrupt to a host system or processor if any excursions occur during a sampling period.

Figure 4:
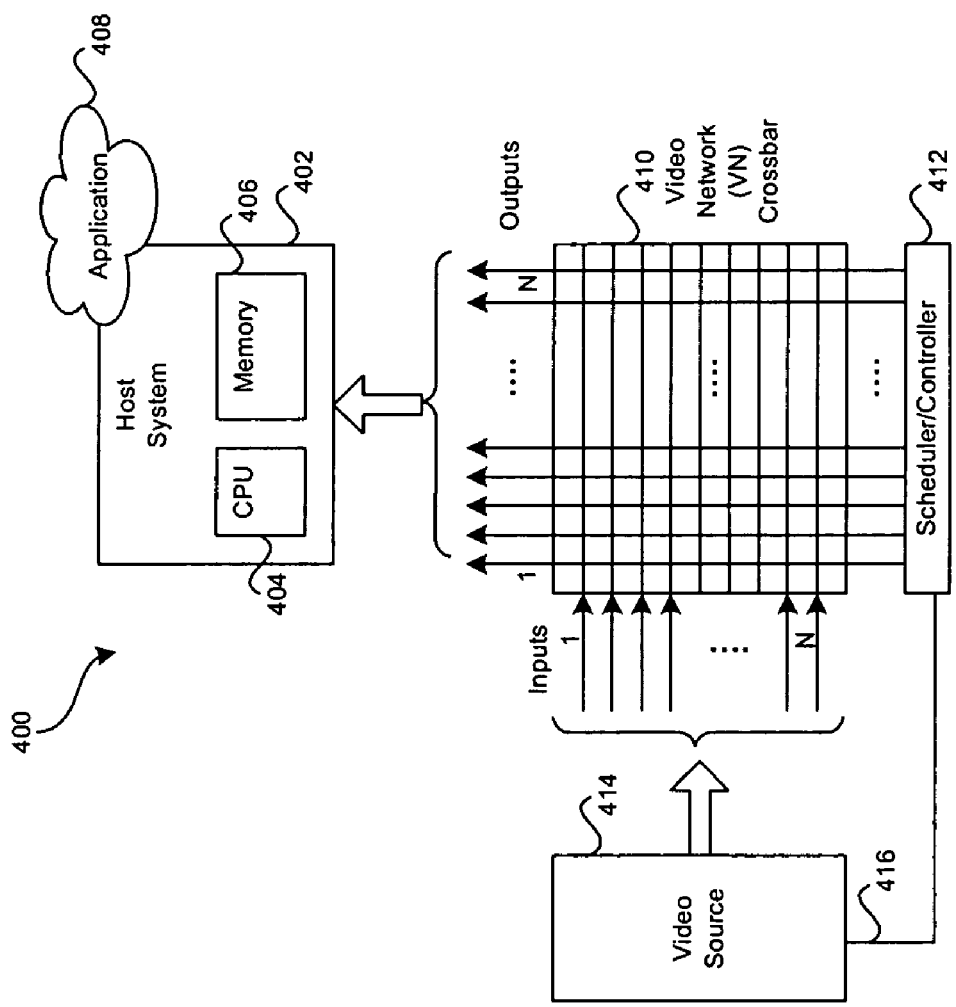
FIG. 4 is a block diagram of an exemplary system that may be utilized in connection with letterbox detection in accordance with an embodiment of the invention.

FIG. 4 is a block diagram of an exemplary system that may be utilized in connection with letterbox detection in accordance with an embodiment of the invention. Referring to FIG. 4, there is shown a host system 402, a video network (VN) crossbar 410, a video source 414 and a scheduler 412. The host system 402 may comprise a CPU or processor 404 and a memory 406. One or more applications in the application block 408 may be executed by the processor 404.

The host system 402 may be a personal computer or other computer system. The host system 402 may be adapted to receive and process output video signals generated from the video network crossbar 410.

The video network crossbar 410 may be any standardized crossbar that may be adapted to switch a plurality of parallel inputs to a plurality of outputs. The inputs of the video network crossbar 410 may be coupled to the output of the video source 414 and the output of the video network crossbar 410 may be coupled to the host system 402. In this regard, the video network crossbar 410 may be adapted to switch any of a plurality of N parallel inputs to any of a plurality of N parallel outputs. The plurality of N parallel outputs may be communicated to the host system 402 via a suitable host interface or bus. U.S. patent application Ser. No. 10/314,525 filed Dec. 9, 2002 entitled "Network Environment for Video Processing Modules," discloses an exemplary crossbar network module and associated system which is representative of the video network crossbar utilized in connection with the present invention. Accordingly, U.S. patent application Ser. No. 10/314,525 filed Dec. 9, 2002 is hereby incorporated herein by reference in its entirety.

The scheduler or controller 412 may be utilized to program the inputs and outputs of the video network crossbar 410 so that the inputs may be appropriately routed to particular outputs. Although the scheduler or controller 412 is illustrated as separate from the video network crossbar 410, the invention may not be so limited. Accordingly, the scheduler or controller 412 and the video network crossbar 410 may be integrated within a single integrated circuit (IC) or chip.

The video source 414 may be adapted to provide digitized output video data to the inputs of the video network crossbar 410. Accordingly, a data output of the video source 414 may be coupled to the data inputs of the video network crossbar 410. One or more control signals from the video source 414 may be provided to the scheduler via control path 416.

The application block 408 may include suitable application software code, firmware and/or scripts that may be adapted to receive and process output data generated by the video network crossbar 410. The application code, firmware and/or scripts may be adapted to utilize the letter box algorithm described herein to detect and display aspect ratio for images. The letterbox detection application code, firmware and/or scripts may be instantiated after the video network crossbar 410. However, in certain instances, more than one letterbox detection instances may be spawned or initiated. In another embodiment of the invention, the letterbox detection may also be implemented as, for example, a video bus (VB) lite client. The letterbox detection may operate on a pixel by pixel basis, and may be configured to operate at clock rates of, for example, about 108 MHz. Notwithstanding, the invention is not so limited and the letterbox detection may also operate at various other speeds which may be higher or lower than 108 MHz.

Output results generated by the letterbox detection may be made accessible in a coherent manner. In this regard, a line and/or column count generated by the letterbox detection algorithm may be double-buffered and buffers providing the double buffering may be updated whenever an end-of-field or end-of-frame is indicated. Accordingly, the video network (VN) crossbar 410 may be adapted to generate an end-of-field or end-of-frame signal whenever the end of a frame or the end of a field is detected. The video network crossbar 410 may further be configured to generate an end-of-field or end-of-frame signal whenever the video network crossbar 410 detects the end-of-field or end-of-frame signal. The interrupt may interrupt the host processor 404 and accordingly, an interrupt routine may cause the host processor 404 to read at least some of the relevant data from the data buffers. In order to ensure coherency, the at least some of the data such as the line and/or column count may be read from the data buffers before the next end-of-field occurs.

In another aspect of the invention, letterbox detection may also be controlled via an RBUS interface. In this regard, various RBUS timing and control signals may be provided for controlling the transfer of video data during operation of the letterbox detection.

In accordance with an embodiment of the invention, the letterbox detection may utilize one or more methods for detecting black and white edges. For example, a number and threshold method, and a luma sum method may be utilized. The number and threshold method, and the luma sum method may be independently applied to the detection of black and white edges. In some cases, the active region of the rows or lines may be limited to a horizontal range [H1, H2], and the active region of the columns may be limited to a vertical range [V1, V2].

With reference to the number and threshold method, a pixel may be considered black if the luma value is less than a programmable threshold, which may be defined using the parameter BLACK. In this regard, BLACK may be defined independently for top/bottom (TB_BLACK) and left/right (LR_BLACK). A line of video may be considered black if the number of non-black pixels is less than a programmable threshold such as BLACK_LINE or BLACK_COL in the case of pillarbox detection. A line of video may be considered white if the number of non-black pixels is greater than a programmable threshold such as WHITE_LINE or WHITE_COL in the case of pillarbox detection. A strength of a white line may refer to the number of non-black pixels for that line. A line of video may be referred to as being non-black if it is not black and a line of video may be referred to as being non-white if it is not white.

With reference to the luma sum method, a line of video may be referred to as being black if the luma sum is less than a programmable threshold such as BLACK_LINE or BLACK_COL in the case or pillarbox detection. A line of video may be referred to as being white if the luma sum is greater than a programmable threshold such as WHITE_LINE or WHITE_COL in the case of pillarbox detection. A strength of a white line may refer to the luma sum for that line. A line of video may be referred to as being non-black if it is not black and a line of video may be referred to as being non-white if it is not white. Accordingly, the luma sum which may be defined as luma_sum may count those pixels that may be greater than BLACK and may be computed as:

luma_sum+=(pixel_luma−BLACK)

For top and bottom, for each field, the letterbox detection may be adapted to record values for the following: a line number of the first non-black line; a line number, and strength including number & sum of the first white line; a line number, and a strength including number & sum of the last white line; and a line number of the last non-black line. These values may be recorded over a plurality of fields. Accordingly, the letterbox detection may be adapted to record values for the following over a plurality of fields: smallest line number of the first non-black line; a smallest line number of the first white line and a largest strength of all white lines with this line number including corresponding number & sum; a largest line number of the last white line and a largest strength of all white lines with this line number including corresponding number & sum; and a largest line number of the last non-black line. These values that are recorded during letterbox detection may be recorded in memory and/or registers that may be double-buffered so that a particular value is not updated while a host processor simultaneously reads that particular value. A host processor may be adapted to clear at least some of the smallest and/or largest values that are recorded so that values for a current line and/or field may be recorded.

In certain instances, appropriate maximum or minimum values may have to be applied. For example, in the case of an all-black image, the letterbox detection may not be able to find a non-black or white line. Accordingly, an appropriate minimum or maximum value may be utilized to indicate this condition. In this regard, the line number of the first non-black line may be a maximum.

With regard to left and right, information recorded for LEFT & RIGHT may be identical to TOP & BOTTOM, but the computation may be complicated by the raster scanning of pixels. According, various optimizations may be made in order to keep the hardware size at a minimum while maintaining the highest efficiency. For example, only the number and threshold method may be utilized for letterbox detection, parameter BLACK_COL may be set to zero (0), and white detection may be performed within a limited range of a black edge. Also, white detection may be performed for about every 2 or 4 columns, for example.

Figure 5:
FIG. 5 is a flow chart illustrating exemplary steps that may be utilized for letterbox detection in accordance with an embodiment of the invention.

FIG. 5 is a flow chart illustrating exemplary steps that may be utilized for letterbox detection in accordance with an embodiment of the invention. Referring to FIG. 5, the exemplary steps may start with step 502. Subsequently, in step 504, a sliding sum grid may be initialized and in step 506, a sliding number grid may be initialized. The sliding sum grid and the sliding number grid may be implemented, for example, in hardware utilizing registers or in software utilizing arrays. Notwithstanding, in step 508, a leftmost edge which may be denoted by a parameter such as left_edge, may be initialized to a particular value. In this instance, the parameter left_edge may be utilized to a value of 2000 or the rightmost edge. However, the invention is not so limited and other values may be utilized. In step 510, a next line may be selected. However, since this is the first pass, in step 508, a first line may be selected. In step 512, the selected line maybe scanned starting from its first column. In step 514, a decision may be made as to whether the pixel for the first column is non-black. If the pixel is not a non-black pixel, then in step 516, go to the next pixel. In step 518, a decision may be made as to whether this is the last pixel for the selected line. If this is not the last pixel in the line, then step 514 is executed and a decision is made as to whether the pixel is non-black. In step 518, if it is determined that this is the last pixel in the selected line, then in step 520, a decision may be made as to whether this is the last line. If this is not the last line, then step 510 may be executed and the next line may be selected.

In step 514, if it is determined that the pixel is a non-black pixel, then in step 526, a parameter K may be set to a value equivalent to the column minus the current value of parameter left_edge. In other words, in step 526, K=(column−left_edge) and K is an index that may be utilized to keep track of the column where the non-black pixels are found for each line. In step 528, a decision may be made as to whether the parameter K is less than zero (0). If the parameter K is not less than zero (0), then in step 530, the sliding sum value[K] is set equal to a prior or previous sliding sum value[K] plus the sum of the difference between the pixel value and a threshold for non-black. In other words, in step 530, the sliding sum value[K]=previous sliding sum value [K]+(pixel value−threshold for non-black). In step 532, the sliding number (#) [K] may be incremented and subsequently in step 516, go to the next pixel or column in the current line.

In step 528 if it is determined that the value of K is less than zero (0), then in step 534, slide out K rightmost values of the sliding sum grid and slide in K zeros (0s) on the left. Additionally, in step 534, the rightmost values that are slid out of the sliding sum grid are discarded. In step 536, slide out K rightmost values of the sliding # grid and slide in K zeros (0s) on the left. Additionally, in step 536, the rightmost values that are slid out of the sliding # grid are discarded. In step 538, the parameter left_edge is set equal to the current column and the parameter K is initialized to zero. Subsequent to step 538, in step 530, the sliding sum value[K] is set equal to a prior sliding sum value[K] plus the sum of the difference between the pixel value and a threshold for non-black. In other words, in step 530, the sliding sum value[K]=previous sliding sum value[K]+(pixel value−threshold for non-black).

In accordance with another embodiment of the invention, the sliding sum may be adapted to utilize a specified number of bins. For example, the sliding sum may be adapted to utilize four (4) bins. However, the invention is not so limited and the number of bins utilized may be other than four (4). In this regard, the exemplary steps of FIG. 5 may include at least one step that may be adapted to track the parameter K to ensure that K does not exceed the number of available bins. If it is determined that that the number of bins are exceeded, then in step 516, go to the next pixel.

Figure 6A:
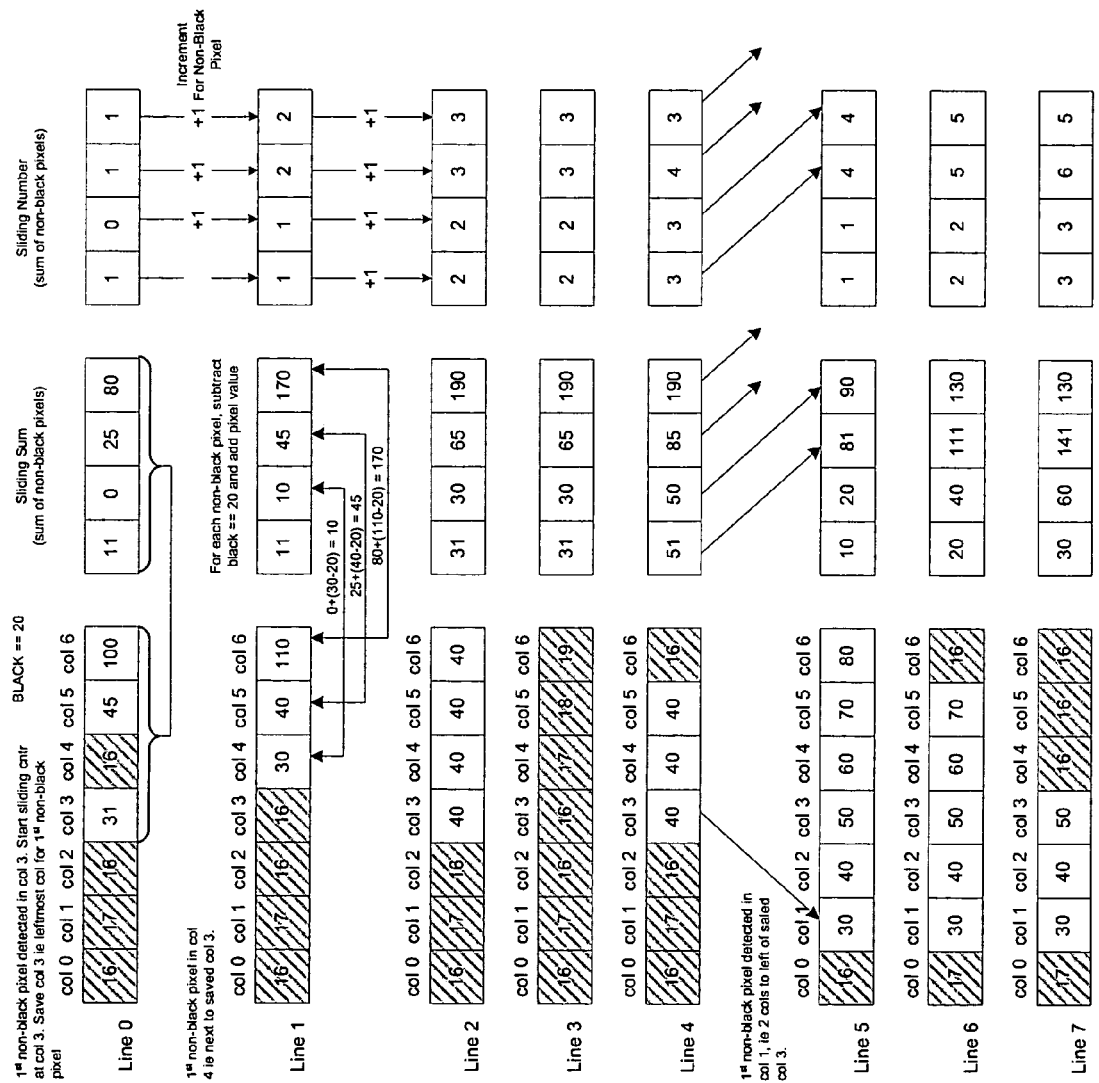
FIG. 6a is a block diagram illustrating an exemplary sliding sum calculation that may be utilized for letterbox detection in accordance with an embodiment of the invention.

In accordance with an embodiment of the invention, the letterbox detection algorithm may be adapted to utilize a sliding sum calculation, which may require a simplified hardware for edge detection. FIG. 6a is a block diagram illustrating an exemplary sliding sum calculation that may be utilized for letterbox detection in accordance with an embodiment of the invention. Referring to FIG. 6a, the sliding sum calculation is utilized for the left edge computation for a small image or a portion of an image. Notwithstanding, although a left edge computation is illustrated, the invention is not so limited and right edge computation may be done in a similar manner.

FIG. 6a comprises eight (8) lines, namely, line 0 through line 7, each line comprising seven (7) columns, namely, column (col 0) through column 7 (col 7). Each of the columns zero (0) through seven (7) represents a pixel which has a value. For example, line zero (0) column or pixel two (2) has a pixel value of sixteen (16) and line zero (0) column or pixel three (3) has a pixel value of thirty-one (31). In this exemplary embodiment of the invention, black threshold is assigned a value of 20. Accordingly, line zero (0) column or pixel two (2) which has a value of sixteen (16) is a black pixel and line zero (0) column or pixel three (3) which has a pixel value of thirty-one (31) is a non-black pixel and is the first non-black pixel.

The sliding sum grid comprises four (4) bins which may be utilized for calculating the sliding sum. Accordingly, whenever a non-black pixel is found, the corresponding bin in the sliding sum grid may be updated to reflect the sliding sum. Initially, each of the bins has a value of zero (0). The sliding sum for a corresponding bin may be determined by: sliding sum =prior sliding sum value +(pixel value−non-black threshold). Accordingly, since the value for the first non-black pixel in line 0 is thirty-one (31), then the sliding sum value for the first bin to the left of the sliding sum grid is (0+(31−20)) or 11. The sliding sum value for the second bin in the sliding sum grid is zero (0) since the column or pixel four (4) of line zero (0) is 16, which represents a black pixel. The sliding sum value for the third bin in the sliding sum grid is (0+(45−20)) or 25 since the column or pixel five (5) of line zero (0) is 25, which represents a non-black pixel. The sliding sum value for the fourth bin in the sliding sum grid is updated to a value of (0+(100−20)) or 80 since the column or pixel six (6) of line zero (0) is 25, which represents a non-black pixel. Before scanning the next line, the column where the first non-black pixel in line zero (0) is stored. In this regard, column three (col 3) is stored.

The sliding number grid also comprises four (4) corresponding bins which may be utilized for calculating the sliding number (#) or the number of non-black pixels. Accordingly, whenever a non-black pixel is located while scanning a line, the sliding number for the corresponding bin may be incremented. Initially, each of the bins has a value of zero (0). In this regard, the first or leftmost bin is updated to a value of (0+1) or one (1), the second bin maintains a value of zero (0), the third bin is updated to a value of (0+1) or one (1), and the fourth bin is updated to a value of (0+1) or one (1). The second bin is not incremented since column four (col 4) is a black pixel.

Line one (1) is then scanned and the first non-black pixel is located at column 4, which is to the right of column three (col 3) where the first non-black pixel for line zero (0) and which was previously stored. Accordingly, the first bin in the sliding sum grid is not updated and maintains its value of eleven (11). The sliding sum value for the second bin in the sliding sum grid is updated to a value of (0+(30−20)) or 10 since the column or pixel four (4) of line one (1) is 30, which represents a non-black pixel. The sliding sum value for the third bin in the sliding sum grid is updated to a value of (25+(40−20)) or 45 since the column or pixel five (5) of line one (1) is 40, which represents a non-black pixel. The sliding sum value for the fourth bin in the sliding sum grid is updated to a value of (80+(110−20)) or 170 since the column or pixel six (6) of line one (1) is 110, which represents a non-black pixel.

With regard to the sliding number for line 1, the first or leftmost bin has a value of one (1) which remains the same. The second bin is updated to a value of (0+1) or one (1), the third bin is updated to a value of (1+1) or two (2), and the fourth bin is updated to a value of (1+1) or two (2). The first bin is not incremented since the fourth column or column three (col 3) is a black pixel.

Line 2 is then scanned and the first non-black pixel is found at column 3 (col 3), the same column as the saved column from line zero (0). The first bin in the sliding sum grid is updated to a value of (11+(40−20)) or thirty-one (31). The sliding sum value for the second bin in the sliding sum grid is updated to a value of (10+(40−20)) or 30 since the column or pixel four (4) of line two (2) is a non-black pixel. The sliding sum value for the third bin in the sliding sum grid is updated to a value of (45+(40−20)) or 65 since the column or pixel five (5) of line two (2) is a non-black pixel. The sliding sum value for the fourth bin in the sliding sum grid is updated to a value of (170+(40−20)) or 190 since the column or pixel six (6) of line two (2) is a non-black pixel. With regard to the sliding number for line 2, the first or leftmost bin is updated to a value of (1+1) or two (2) and the second bin is updated to a value of (1+1) or two (2). The third bin is updated to a value of (2+1) or three (3), and the fourth bin is updated to a value of (2+1) or three (3).

Line 3 is then scanned and found to contain no non-black pixel. Accordingly, the values in the sliding sum grid and the values in the sliding number grid remains the same.

Line 4 is then scanned and the first non-black pixel is found at column 3 (col 3), the same column as the saved column from line zero (0). The first bin in the sliding sum grid is updated to a value of (31+(40−20)) or fifty-one (51). The sliding sum value for the second bin in the sliding sum grid is updated to a value of (30+(40−20)) or 50 since the column or pixel four (4) of line four (4) is a non-black pixel. The sliding sum value for the third bin in the sliding sum grid is updated to a value of (65+(40−20)) or 85 since the column or pixel five (5) of line four (4) is a non-black pixel. The sliding sum value for the fourth bin remains the same at 190 since column six (col 6) is a black pixel. With regard to the corresponding sliding number grid for line 4, the first or leftmost bin is updated to a value of (2+1) or three (3) and the second bin is updated to a value of (2+1) or three (3). The third bin is updated to a value of (3+1) or four (4), and the fourth bin remains the same since column six (col 6) is a black pixel.

Figure 6B:
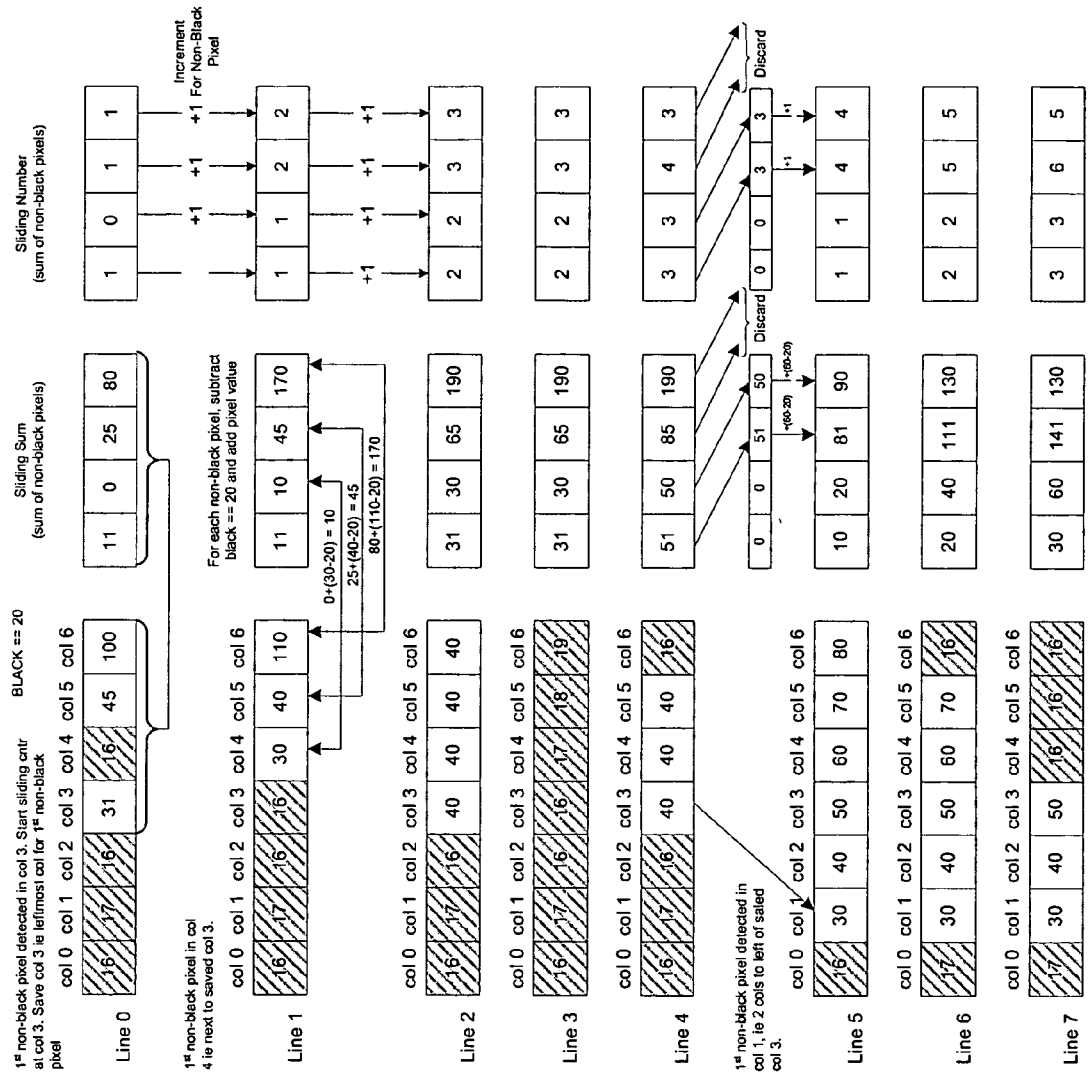
FIG. 6b is a block diagram illustrating the sliding or shifting out/and in of values in the sliding sum bins and sliding number bins in connection with FIG. 6a in accordance with an embodiment of the invention.

Line 5 is then scanned and the first non-black pixel is found at column 1 (col 1), which is two columns to the left of the saved column from line zero (0). FIG. 6b is a block diagram illustrating the sliding or shifting out and in of values in the sliding sum bins and sliding number bins in connection with FIG. 6a in accordance with an embodiment of the invention. Referring to FIG. 6b, the pixel values in the two rightmost sliding sum bins, namely 85 and 100, are slid or shifted out of the sliding sum grid and discarded. Zeroes (0s) are then slid or shifted into the two leftmost sliding sum bins of the sliding sum grid. A similar sliding or shifting out and in occurs with the sliding number. In this regard, the sliding number values in the two rightmost sliding number bins, namely 4 and 3, are slid or shifted out of the sliding number grid and discarded. Zeroes (0s) are then slid or shifted into the two leftmost sliding number bins of the sliding sum grid.

For line 5, since the first non-white pixel is found at the second column or column 1 (col 1), the first bin in the sliding sum grid is updated to a value of (0+(30−20)) or ten (10). The sliding sum value for the second bin in the sliding sum grid is updated to a value of (0+(40−20)) or twenty (20) since the column or pixel two (2) of line five (5) is a non-black pixel. The sliding sum value for the third bin in the sliding sum grid is updated to a value of (51+(50−20)) or 81 since the column or pixel three (3) of line five (5) is a non-black pixel. The sliding sum value for the fourth bin in the sliding sum grid is updated to a value of (60+(50−20)) or 90 since the column or pixel four (4) of line five (5) is a non-black pixel. With regard to the corresponding sliding number grid for line 5, the first or leftmost bin is updated to a value of value of one (0+1) or one (1) and the second bin is updated to a value of value of (0+1) or one (1). The third bin is updated to a value of (3+1) or four (4), and the fourth bin is updated to a value of (3+1) or four (4).

Line 6 is then scanned and the first non-black pixel is found at the second column or column one (col 1). Accordingly, the first bin in the sliding sum grid is updated to a value of (10+(30−20)) or twenty (20). The sliding sum value for the second bin in the sliding sum grid is updated to a value of (20+(40−20)) or forty (40) since the column or pixel two (2) of line six (6) is a non-black pixel. The sliding sum value for the third bin in the sliding sum grid is updated to a value of (81+(50−20)) or 111 since the column or pixel three (3) of line six (6) is a non-black pixel. The sliding sum value for the fourth bin in the sliding sum grid is updated to a value of (90+(60−20)) or 130 since the column or pixel four (4) of line six (6) is a non-black pixel. With regard to the corresponding sliding number grid for line 5, the first or leftmost bin is updated to a value of one (1+1) or two (2) and the second bin is updated to a value of (1+1) or two (2). The third bin is updated to a value of (4+1) or five (5), and the fourth bin is updated to a value of (4+1) or five (5).

Line 7 is then scanned and the first non-black pixel is found at the second column or column one (col 1). Accordingly, the first bin in the sliding sum grid is updated to a value of (20+(30−20)) or thirty (30). The sliding sum value for the second bin in the sliding sum grid is updated to a value of (40+(40−20)) or sixty (60) since the column or pixel two (2) of line seven (7) is a non-black pixel. The sliding sum value for the third bin in the sliding sum grid is updated to a value of (111+(50−20)) or 141 since the column or pixel three (3) of line seven (7) is a non-black pixel. The sliding sum value for the fourth bin in the sliding sum grid remains the same at 130 since the column or pixel four (4) of line seven (7) is a non-black pixel. With regard to the corresponding sliding number grid for line 5, the first or leftmost bin is updated to a value of one (2+1) or three (3) and the second bin is updated to a value of (2+1) or three (3). The third bin is updated to a value of (5+1) or six (6), and the fourth bin is not updated since column or pixel four (4) of line seven (7) is a non-black pixel.

At this point the end-of-field has been reached and a black edge is detected at column one (1). The white edge may be determined from the sliding sum and sliding number. In this regard, if the luma sum threshold is 100, then a white edge will be located at column 3 (col 3) since the third bin of the sliding sum grid contains a value of 141 which is greater than 100. In a similar case where the luma sum threshold is 7, then a white edge would not be found. In accordance with an embodiment of the invention, the sliding counters comprising the sliding sum and the sliding number correctly computes the luma sum and the number of non-black pixels for the 4 columns to the right of the black edge. This may be true even if the black edge moves during the computation.

Accordingly, for each field, the letterbox detection may be adapted to record the following: a column number of the first non-black column; a column number, and strength including number and sum of the first white column; a column number, and strength including number & sum of the last white column; and a column number of the last non-black column. Over multiple fields, the letterbox detection may be adapted to record, for example, the following: a smallest column number of the first non-black column; a smallest column number of the first white column, and a largest strength of all white columns with this column number including number & sum; a largest column number of the last white column and the largest strength of all white columns with this column number including number & sum; and a largest column number of the last non-black column.

The letterbox detection may also be adapted to record the minimum luma value over time. In instances where the minimum luma value is cleared to a maximum (max) value by a host CPU, then the letterbox detection may not record the minimum luma value. Independent thresholds may be set for the top, bottom, left, and right black edges. If the black edges exceed these thresholds, an interrupt may be generated for the host. The interrupt may be referred to as an excursion interrupt and may be generated, for example, for top and left if the black edge is less than the respective threshold. An interrupt may also be generated for bottom and right if the black edge is greater than the respective threshold.

In accordance with an embodiment of the invention, the automatic letterbox detection and compensation may be system dependent. Hence, in order to detect letterbox or pillarbox regions, software or other code may be adapted to follow various exemplary guidelines. For example, parameters may have to be set to specific values for a particular video source since black may vary between a digital source and an analog source. During detection, records such as the sliding sum and sliding number may be cleared, collected after a wait of about 100 fields and then checked. If the black edges are detected at reasonable letterbox or pillarbox boundaries, the white edges are in close proximity, and the white edges are strong, then it is very likely that a letterbox source has been detected.

Regarding non-detection, in order to detect the removal of letterbox/pillarbox regions, the excursion interrupts may be set to just inside the current edges; and if the interrupt triggers, an excursion has occurred, and any cropping should be undone. When vertical cropping is applied at the MPEG feeder, it is important to leave a few black lines for non-detection of letterbox.

Subtitles may appear/disappear over time, and may cause annoying transitions in/out of letterbox. The software may be adapted to apply some hysteresis to the transitions. For example, the first time after a center-cut, there could be a waiting period of about 10 seconds before cutting again. The second time, there could be a waiting period of about 20 seconds. The third time, there could be a waiting period of about 40 seconds, for example. After about an hour without transitions, a hysteresis timer may be reset.

For center cut standard definition to high definition, the primary or high definition display path may not have a capture/playback. In this regard, vertical cropping may occur in a video feeder, and may affect the secondary display. Accordingly, it may not be possible to vertically crop the primary display without also cropping the secondary display. This may not normally be an issue because vertical cropping usually removes black lines that may be re-inserted by a video compositor, if needed. Also, for center cut standard definition to high definition in which video inputs may be required to go through capture/playback, vertical cropping may also occur in the video feeder. For high definition to standard definition, center cut is expected to pass at least some of the pixels through an MPEG video feeder. Since a video scaler may utilize a line buffer to handle changes in horizontal size, cropping of the sides of an image may not cause artifacts to occur on another display.

For cropping and letterbox detection, letterboxes may be almost any size, or aspect ratio and letterboxes may have smooth edges due to limited bandwidth in the source or the MPEG encoding. Vertical cropping may occur in the feeder. But, once the black lines are cropped, there may be no method to detect a transition to a non-letterbox source. A video processing system such as an video processing integrated circuit may be adapted to support a plurality of solutions for letterbox detection. For example, letterbox detection may be located after a first crossbar and in this manner, the non-MPEG inputs may undergo letterbox detection before they are cropped. In the case of MPEG sources, all the black lines do not have to be cropped at the video feeder. Accordingly, at least a portion of the black lines may be cropped at the video scaler, cropped at the video compositor, and/or displayed on the screen. In a case where there are only a few black lines, the video compositor may be utilized. However, in a case where the number of lines are large, bandwidth restraints may force the display of black lines on the screen.

For MPEG, subtitles typically begin a few lines below the letterbox edge. If the video network (VN) crossbar is not capable of supporting enough lines, subtitles encoded in an MPEG source may not be detected in the video network. In this regard, letterbox detection may have to be modified in order to support subtitle detection for cropped MPEG sources which typically does not include encoded subtitles. However, in instances where the video network may be configured to pass the full MPEG frame, the letterbox detection may reliably detect subtitles for cropped MPEG sources for at least some standard definition configurations.

The table below illustrates exemplary common video network configurations in accordance with various embodiments of the invention.

| Source | Feeder | HD Scaler & Output | SD output |
|---|---|---|---|
| 4:3 | All rows, all pixels | Pillarbox - square scale, compositor adds black pillars<br>Non-square scale - scale<br>Vertical center cut is NOT allowed. This crops rows, and corrupts simultaneous SD output | Standard |
| 16:9 Pillarbox (similar to 4:3) | All rows, all pixels | Pillarbox - no change<br>Non-square scale - scale<br>Vertical center cut is NOT allowed. This crops rows, and corrupts simultaneous SD output | Horizontal center cut, and aspect-ratio correct (square) scale |
| 16:9 | All rows, all pixels | Standard | Letterbox - square scale, compositor adds black rows<br>Non-square scale - scale<br>Center cut - square scale, compositor selects window |
| 4:3 letterbox (similar to 16:9) | Skip most black rows | Square scale (aspect ratio correct scaling) | Letterbox - no scale, compositor adds black rows<br>Non-square scale - scale<br>Horizontal center cut - square scale, compositor selects window |

The following illustrates a listing of exemplary code that may be utilized by a method and system for automatic aspect ratio detection utilizing letterbox detection in accordance with various embodiments of the invention.

```
// Letterbox detection
// This version has been revised to more accurately
// reflect the architecture specification. It is not
// necessarily bit accurate, but it should be close.
#include <stdio.h>
#include <stdlib.h>
#include <string.h>
#include <math.h>
#include "vdo.h"
#include "utl.h"
int main (int argc, char *argv[ ])
{
  FILE *fi;
  char string[256];
  int mi, hi, wi;
  int x, y, tmp;
  int ty;
  int tb_black, lr_black, black_line, white_line, detection;
  int black_col, white_col;
  int tb_number, luma_sum;
```

-continued

```
   int h_start, h_end, v_start, v_end;
   int first_non_black, first_white;
   int first_tb_number, first_tb_sum;
   int last_non_black, last_white;
   int last_tb_number, last_tb_sum;
   int found_first_non_black, found_first_white;
   int left_num[4], left_sum[4], right_num[4], right_sum[4];
   int left_edge, right_edge;
   int left_black_edge, left_white_edge;
   int right_black_edge, right_white_edge;
   int left_strength, right_strength;
   int min_luma;
   pic_t *ip_444, *tmp_pic, *ip2_pic;
   if (argc != 13) {
      printf("Letterbox Detection block (LBOX)\n\n");
      printf("Usage : lbox tb lr bl wl d hs he vs ve bc wc <in.ppm>\n\n");
      printf(" tb = top/bottom black, lr = left/right black\n");
      printf(" bl = black line, wl = white line \n");
      printf(" d = detection : 0 = number, 1 = sum \n");
      printf(" hs = horiz start, he = horiz end \n");
      printf(" vs = vert start, ve = vert end \n");
      printf(" bc = black column, wc = white column\n\n");
      exit(1);
   }
   mi = FRAME;
   tb_black = atoi(argv[1]);
   lr_black = atoi(argv[2]);
   black_line = atoi(argv[3]);
   white_line = atoi(argv[4]);
   detection = atoi(argv[5]);
   h_start  = atoi(argv[6]);
   h_end    = atoi(argv[7]);
   v_start  = atoi(argv[8]);
   v_end    = atoi(argv[9]);
   black_col = atoi(argv[10]);
   white_col = atoi(argv[11]);
   if (detection) {
       printf("LBOX %s : luma sum algorithm\n", argv[12]);
   }
   else {
       printf("LBOX %s: number & threshold algorithm\n", argv[12]);
   }
   if ((fi = fopen(argv[12], "r")) == NULL)
      {
         fprintf(stderr, "Error: Can't open infile %s.\n", argv[12]);
         exit(1);
      }
   //printf("Creating Buffers\n");
   ip_444 = readppm(fi);
   wi = ip_444->w;
   hi = ip_444->h;
   ip2_pic = pcreate(mi, YUV_SD, YUV_444, wi, hi);
   rgb2yuv(ip_444, ip2_pic);
   first_non_black = 0x0fff; // init to max
   first_white   = 0x0fff;
   first_tb_number = 0;
   first_tb_sum  = 0;
   last_white    = 0x0000;
   last_non_black = 0x0000;
   last_tb_number = 0;
   last_tb_sum   = 0;
   left_edge    = 0x0fff;
   right_edge   = 0x0004; // never less than 4
   min_luma = 255;
   if (wi < h_end) {
      printf("Warning: h_end is greater than picture width.\n");
      printf(" Processing will end at picture boundary.\n\n");
      h_end = wi;
   }
   if (hi < v_end) {
      printf("Warning: v_end is greater than picture height.\n");
      printf(" Processing will end at picture boundary.\n\n");
      v_end = hi;
   }
   //printf("Top/Bottom Edge Detection...\n");
   found_first_non_black = 0;
   found_first_white = 0;
   // Note that Top/Bottom edge detection is only affected by
   // h_start and h_end. It is not affected by v_start or v_end.
```

```
for (y = 0; y < hi; y++) {
  tb_number = 0;
  luma_sum = 0;
  for (x = h_start; x < h_end; x++) {
    ty = (ip2_pic->data.yuv.y[y][x]);
    // TOP & BOTTOM, number & luma_sum
    if (ty >= tb_black) {
tb_number++; // you can share the subtractor between
luma_sum += (ty - tb_black); // ">=" and "ty - black"
    }
    // MIN_LUMA
    if (ty < min_luma) {min_luma = ty;}
  }
  // END OF LINE PROCESSING
  if (!(found_first_non_black)) {
    if (((detection) && (luma_sum > black_line)) ||
(!(detection) && (tb_number > black_line))) {
found_first_non_black = 1;
first_non_black = y;
//printf("top luma sum = %d\n", luma_sum);
    }
  }
  if (!(found_first_white)) {
    if (((detection) && (luma_sum > white_line)) ||
(!(detection) && (tb_number > white_line))) {
found_first_white = 1;
first_white = y;
first_tb_number = tb_number;
first_tb_sum = luma_sum;
    }
  }
  if (((detection) && (luma_sum > black_line)) ||
(!(detection) && (tb_number > black_line))) {
    last_non_black = y;
  }
  if (((detection) && (luma_sum > white_line)) ||
(!(detection) && (tb_number > white_line))) {
    last_white = y;
    last_tb_number = tb_number;
    last_tb_sum = luma_sum;
  }
}
printf("TOP: black %d, white %d, number %d, sum %d\n",
    first_non_black, first_white, first_tb_number, first_tb_sum);
printf("BOTTOM: black %d, white %d, number %d, sum %d\n",
    last_non_black, last_white, last_tb_number, last_tb_sum);
printf("MIN_LUMA: %d\n", min_luma);
//printf("Left/Right Edge Detection...\n");
// These registers represent the sliding L/R counters.
// Hardware may omit left_sum and right_sum.
for (x = 0; x < 4; x++) {
  left_num[x] = 0; left_sum[x] = 0;
  right_num[x] = 0; right_sum[x] = 0;
}
// Note that Left/Right edge detection is only affected by
// v_start and v_end. It is not affected by h_start or h_end.
for (y = v_start; y < v_end; y++) {
  for (x = 0; x < wi; x++) {
    ty = (ip2_pic->data.yuv.y[y][x]);
    // LEFT EDGE
    if (ty >= lr_black) {
if (x < left_edge) { // new edge, slide window
  for (tmp = 0; tmp < (left_edge - x); tmp++) {
    left_num[3] = left_num[2]; left_sum[3] = left_sum[2];
    left_num[2] = left_num[1]; left_sum[2] = left_sum[1];
    left_num[1] = left_num[0]; left_sum[1] = left_sum[0];
    left_num[0] = 0;      left_sum[0] = 0;
  }
  left_edge = x;
}
tmp = x - left_edge;
if ((tmp >= 0) && (tmp <= 3)) {
  left_num[tmp]++;
  left_sum[tmp] += (ty - lr_black);
}
    }
    // RIGHT EDGE
    if (ty >= lr_black) {
tmp = x - right_edge - 3;
```

-continued

```
        if (tmp > 0) { // new edge, slide window
            for (tmp = 0; tmp < (x - right_edge - 3); tmp++) {
                right_num[3] = right_num[2]; right_sum[3] = right_sum[2];
                right_num[2] = right_num[1]; right_sum[2] = right_sum[1];
                right_num[1] = right_num[0]; right_sum[1] = right_sum[0];
                right_num[0] = 0;     right_sum[0] = 0;
            }
            right_edge = x - 3;
            //printf("%d, %d\n", right_edge, y);
        }
        tmp = right_edge - x;
        if ((tmp >= 0) && (tmp <= 3)) {
            right_num[tmp]++;
            right_sum[tmp] += (ty - lr_black);
        }
            }
        }
    }
}
// END of L/R processing
left_black_edge = 0x07ff; // default values
right_black_edge = 0;
left_white_edge = 0x07ff;
right_white_edge = 0;
left_strength = 0;
right_strength = 0;
if (left_num[0] > black_col) {left_black_edge = left_edge;}
else if (left_num[1] > black_col) {left_black_edge = left_edge+1;}
else if (left_num[2] > black_col) {left_black_edge = left_edge+2;}
else if (left_num[3] > black_col) {left_black_edge = left_edge+3;}
if (left_num[0] > white_col) {
    left_white_edge = left_edge;
    left_strength = left_num[0];
}
else if (left_num[1] > white_col) {
    left_white_edge = left_edge+1;
    left_strength = left_num[1];
}
else if (left_num[2] > white_col) {
    left_white_edge = left_edge+2;
    left_strength = left_num[2];
}
else if (left_num[3] > white_col) {
    left_white_edge = left_edge+3;
    left_strength = left_num[3];
}
if (right_num[3] > black_col) {right_black_edge = right_edge+3;}
else if (right_num[2] > black_col) {right_black_edge = right_edge+2;}
else if (right_num[1] > black_col) {right_black_edge = right_edge+1;}
else if (right_num[0] > black_col) {right_black_edge = right_edge+0;}
if (right_num[3] > white_col) {
    right_white_edge = right_edge+3;
    right_strength = right_num[3];
}
else if (right_num[2] > white_col) {
    right_white_edge = right_edge+2;
    right_strength = right_num[2];
}
else if (right_num[1] > white_col) {
    right_white_edge = right_edge+1;
    right_strength = right_num[1];
}
else if (right_num[0] > white_col) {
    right_white_edge = right_edge+0;
    right_strength = right_num[0];
}
printf("LEFT: %d    LEFT_BLACK: %d    LEFT_WHITE: %d    STRENGTH: %d\n",
    left_edge, left_black_edge, left_white_edge, left_strength);
printf(" LEFT NUM: %d %d %d %d\n",
  left_num[0], left_num[1], left_num[2], left_num[3]);
printf(" LEFT SUM: %d %d %d %d\n",
  left_sum[0], left_sum[1], left_sum[2], left_sum[3]);
printf("RIGHT: %d    RIGHT_BLACK: %d    RIGHT_WHITE: %d    STRENGTH: %d\n",
    right_edge, right_black_edge, right_white_edge, right_strength);
printf(" RIGHT NUM: %d %d %d %d\n",
  right_num[3], right_num[2], right_num[1], right_num[0]);
```

```
                                -continued printf(" RIGHT SUM: %d %d %d %d\n",
       right_sum[3], right_sum[2], right_sum[1], right_sum[0]);
       printf("-------------------------------------\n\n");
    }
```

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it may be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention may include all embodiments falling within the scope of the appended claims.

What is claimed is:

1. A method for automatic aspect ratio detection, the method comprising:
    scanning lines in at least a selected portion of an image;
    locating a first reference pixel in one of said scanned lines;
    generating a sliding sum of pixel values, starting from said first reference pixel;
    generating a sliding number starting from said first reference pixel, said sliding number indicative of a number of non-black pixels in said scanned lines and said sliding number based on said sliding sum; and
    determining a white edge based on one or both of said generated sliding sum and said generated sliding number.

2. The method according to claim 1, wherein said first reference pixel is a non-black pixel based on an associated pixel value.

3. The method according to claim 2, comprising defining a value that represents non-black for said non-black pixel.

4. The method according to claim 1, comprising utilizing m bins for each of said sliding sum and said sliding number, where m is greater than one (1).

5. The method according to claim 1, comprising comparing a luma sum threshold with said generated sliding sum to locate said white edge.

6. A machine-readable storage having stored thereon, a computer program having at least one code section for automatic aspect ratio detection, said at least one code section being executable by a machine for causing the machine to perform steps comprising:
    scanning lines in at least a selected portion of an image;
    locating a first reference pixel in one of said scanned lines;
    generating a sliding sum of pixel values, starting from said first reference pixel;
    generating a sliding number starting from said first reference pixel, said sliding number indicative of a number of non-black pixels in said scanned lines and said sliding number based on said sliding sum; and
    determining a white edge based on one or both of said generated sliding sum and said generated sliding number.

7. The machine-readable storage according to claim 6, wherein said first reference pixel is a non-black pixel based on an associated pixel value.

8. The machine-readable storage according to claim 7, comprising code for defining a value that represents non-black for said non-black pixel.

9. The machine-readable storage according to claim 6, comprising code for utilizing m bins for each of said sliding sum and said sliding number, where m is greater than one (1).

10. The machine-readable storage according to claim 6, comprising code for comparing a luma sum threshold with said generated sliding sum to locate said white edge.

11. A system for automatic aspect ratio detection, the system comprising:
    at least one processor for scanning lines in at least a selected portion of an image;
    said at least one processor locates a first reference pixel in one of said scanned lines;
    said at least one processor generates a sliding sum of pixel values, starting from said first reference pixel;
    said at least one processor generates a sliding number starting from said first reference pixel, said sliding number indicative of a number of non-black pixels in said scanned lines and said sliding number based on said sliding sum; and
    said at least one processor determines a white edge based on one or both of said generated sliding sum and said generated sliding number.

12. The system according to claim 11, wherein said first reference pixel is a non-black pixel based on an associated pixel value.

13. The system according to claim 12, wherein said at least one processor defines a value that represents non-black for said non-black pixel.

14. The system according to claim 11, comprising utilizing m bins for each of said sliding sum and said sliding number, where m is greater than one (1).

15. The system according to claim 11, wherein said at least one processor compares a luma sum threshold with said generated sliding sum to locate said white edge.

16. The system according to claim 11, wherein said at least one processor is a host CPU or an on-chip processor.

17. A method for automatic aspect ratio detection, the method comprising:
   scanning lines in at least a selected portion of an image;
   locating a first reference pixel in one of said scanned lines;
   generating a sliding sum of pixel values, starting from said first reference pixel;
   generating a sliding number starting from said first reference pixel, said sliding number indicative of a number of non-black pixels in said scanned lines and said sliding number based on said sliding sum;
   determining a white edge based on one or both of said generated sliding sum and said generated sliding number; and
   utilizing m bins for each of said sliding sum and said sliding number, where m is greater than one (1).

18. The method according to claim 17, comprising determining said sliding sum by calculating, sliding sum value [k]=prior sliding sum value[k]+(pixel value−non-black threshold), where k=(current column−left edge), prior sliding sum value[k] is initially zero (0) for each of said m bins, left edge is the column where the leftmost pixel is located, and k is not less than zero (0).

19. The method according to claim 18, comprising, if k is not less than zero (0), incrementing sliding number[k] for each of said m bins to determine said sliding number.

20. The method according to claim 18, comprising:
   if k is less than zero (0):
      sliding mod[k] rightmost values of said sliding sum out;
      discarding said mod[k] rightmost values of said sliding sum; and
      sliding in mod[k] zeroes (0s) in leftmost values of said sliding sum.

21. The method according to claim 18, comprising:
   if k is less than zero (0):
      sliding mod[k] rightmost values of said sliding number out;
      discarding said mod[k] rightmost values of said sliding number; and
      sliding in mod[k] zeroes in leftmost values of said sliding number.

22. The method according to claim 21, comprising:
   if K is less than zero (0):
      setting a left edge equivalent to said current column;
      initializing k to zero (0); and
      computing said sliding sum value [k].

23. A machine-readable storage having stored thereon, a computer program having at least one code section for automatic aspect ratio detection, said at least one code section being executable by a machine for causing the machine to perform steps comprising:
   scanning lines in at least a selected portion of an image;
   locating a first reference pixel in one of said scanned lines;
   generating a sliding sum of pixel values, starting from said first reference pixel;
   generating a sliding number starting from said first reference pixel, said sliding number indicative of a number of non-black pixels in said scanned lines and said sliding number based on said sliding sum;
   determining a white edge based on one or both of said generated sliding sum and said generated sliding number; and
   utilizing m bins for each of said sliding sum and said sliding number, where m is greater than one (1).

24. The machine-readable storage according to claim 23, comprising code for determining said sliding sum by calculating, sliding sum value[k]=prior sliding sum value[k]+ (pixel value−non-black threshold), where k=(current column−left edge), prior sliding sum value[k] is initially zero (0) for each of said m bins, left edge is the column where the leftmost pixel is located, and k is not less than zero (0).

25. The machine-readable storage according to claim 24, comprising code for incrementing sliding number[k] for each of said m bins to determine said sliding number, if k is not less than zero (0).

26. The machine-readable storage according to claim 24, comprising code for:
   if k is less than zero (0):
      sliding mod[k] rightmost values of said sliding sum out;
      discarding said mod[k] rightmost values of said sliding sum; and
      sliding in mod[k] zeroes (0s) in leftmost values of said sliding sum.

27. The machine-readable storage according to claim 24, comprising code for:
   if k is less than zero (0):
      sliding mod[k] rightmost values of said sliding number out;
      discarding said mod[k] rightmost values of said sliding number; and
      sliding in mod[k] zeroes (0s) in leftmost values of said sliding number.

28. The machine-readable storage according to claim 27, comprising code for:
   if K is less than zero (0):
      setting a left edge equivalent to said current column;
      initializing k to zero (0); and
      computing said sliding sum value [k].

29. A system for automatic aspect ratio detection, the system comprising:
   at least one processor for scanning lines in at least a selected portion of an image;
   said at least one processor locates a first reference pixel in one of said scanned lines;
   said at least one processor generates a sliding sum of pixel values, starting from said first reference pixel;
   said at least one processor generates a sliding number starting from said first reference pixel, said sliding number indicative of a number of non-black pixels in said scanned lines and said sliding number based on said sliding sum; and
   said at least one processor determines a white edge based on one or both of said generated sliding sum and said generated sliding number.

30. The system according to claim 29, comprising utilizing m bins for each of said sliding sum and said sliding number, where m is greater than one (1).

31. The system according to claim 30, wherein said at least one processor determines said sliding sum by calculating, sliding sum value[k]=prior sliding sum value[k]+ (pixel value−non-black threshold), where k=(current column−left edge), prior sliding sum value[k] is initially zero (0) for each of said m bins, left edge is the column where the leftmost pixel is located, and k is not less than zero (0).

32. The system according to claim 31, wherein said at least one processor, if k is not less than zero (0), increments sliding number[k] for each of said m bins to determine said sliding number.

33. The system according to claim 31, wherein said at least one processor:
   if k is less than zero (0):
      slides mod[k] rightmost values of said sliding sum out;
      discards said mod[k] rightmost values of said sliding sum; and
      slides in mod[k] zeroes (0s) in leftmost values of said sliding sum.

34. The system according to claim 31, comprising:
   if k is less than zero (0):
      slides mod[k] rightmost values of said sliding number out;
      discards said mod[k] rightmost values of said sliding number; and
      slides in mod[k] zeroes (0s) in leftmost values of said sliding number.

35. The system according to claim 34, wherein said at least one processor:
   if K is less than zero (0):
      sets a left edge equivalent to said current column;
      initializes k to zero (0); and
   computes said sliding sum value [k].

* * * * *